Feb. 26, 1924.  
M. R. DEL CASTILLO  
PNEUMATIC MILK EXTRACTOR  
Filed Sept. 23, 1921   2 Sheets-Sheet 2
1,484,874
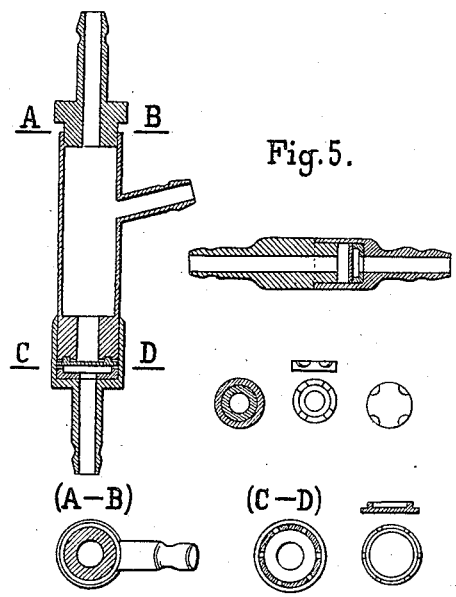
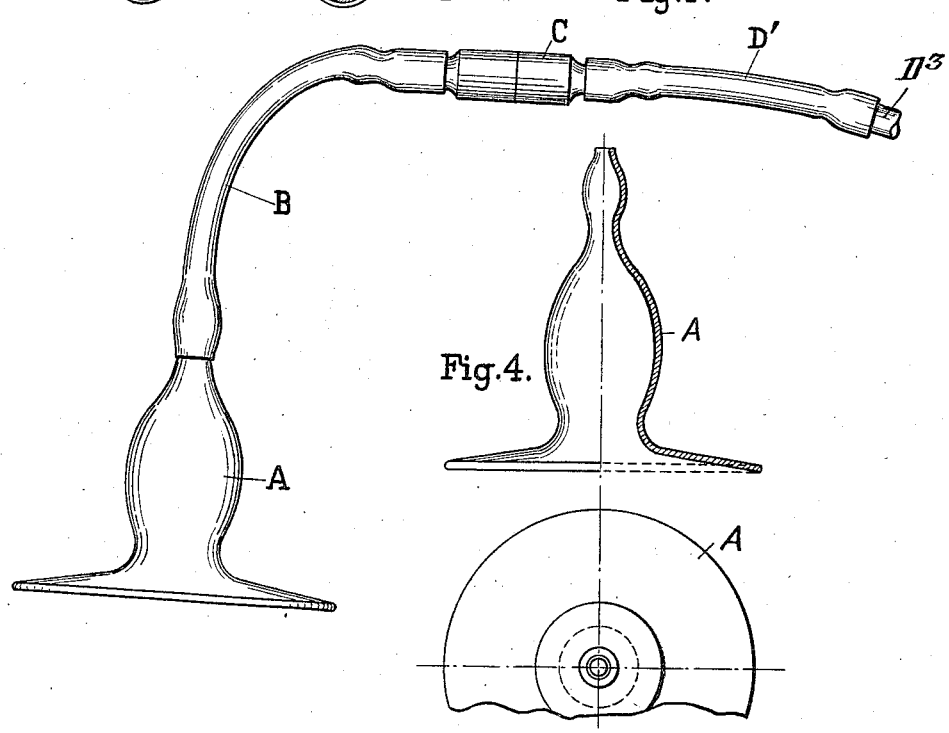
Inventor:
Miguel Rodriguez del Castillo
by [signature], attorney.

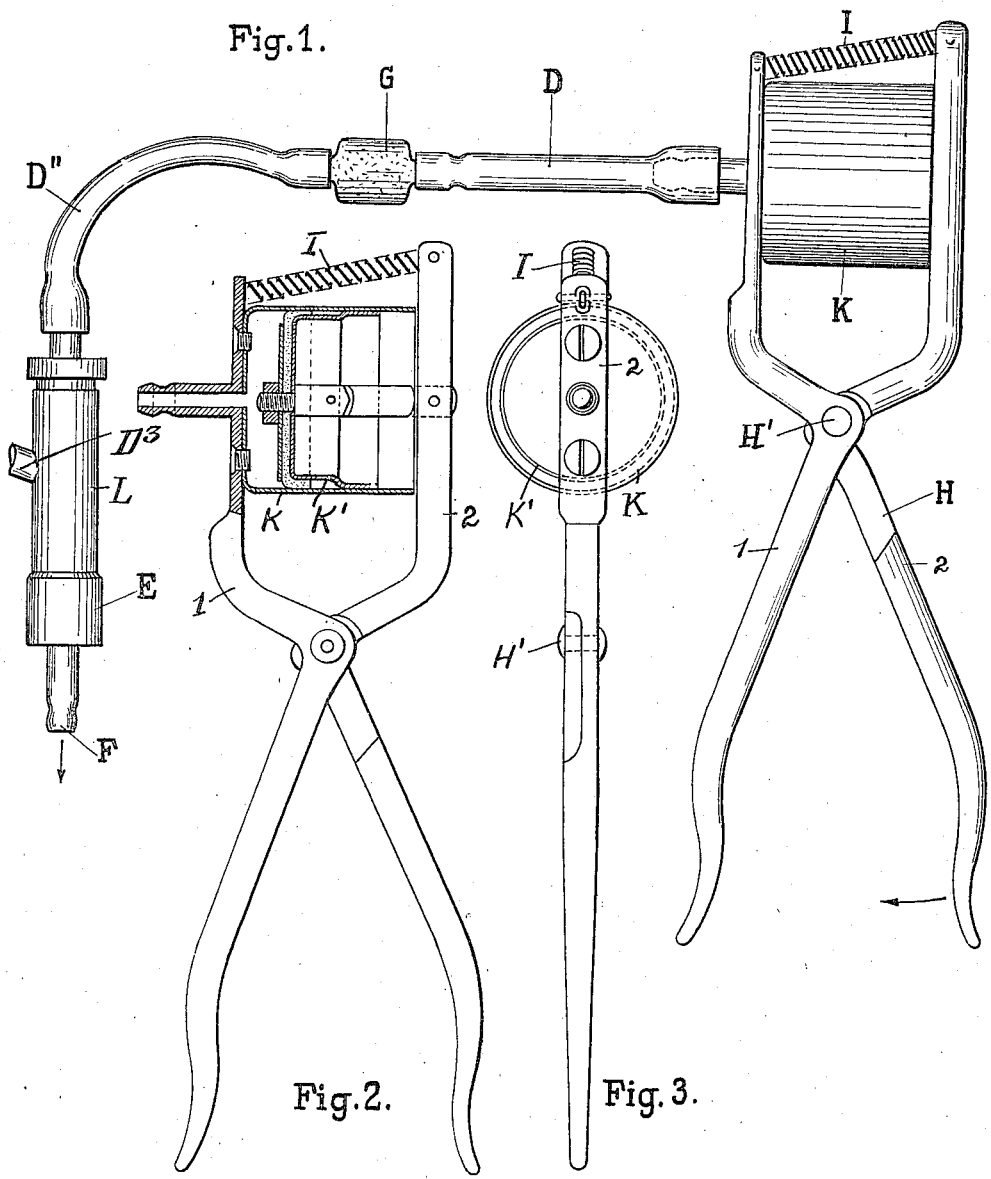

Patented Feb. 26, 1924.

1,484,874

UNITED STATES PATENT OFFICE.

MIGUEL R. DEL CASTILLO, OF SAN SEBASTIAN, SPAIN.

PNEUMATIC MILK EXTRACTOR.

Application filed September 23, 1921. Serial No. 502,654.

*To all whom it may concern:*

Be it known that MIGUEL RODRIGUEZ DEL CASTILLO, a subject of the King of Spain, residing at Buen Pastor Street 13, San Sebastian, Guipuzcoa, Spain, has invented certain new and useful Improvements in Pneumatic Milk Extractors, of which the following is a specification, reference being had therein to the accompanying drawing.

My invention relates to improvements in pneumatic milk extractors.

The object of the invention is to provide a hand operated pneumatic apparatus for extracting or drawing off the milk existing in the interior of the human organism and pumping it into a suitable receptacle.

This apparatus is illustrated by way of example in the annexed drawing in which:

Figure 1 is a side elevation of one-half of the complete apparatus,

Figure 1ª is a similar view of the other half of the apparatus,

Figure 2 is a side elevation partly in section of the pump,

Figure 3 is a front elevation of Figure 2.

Figure 4 illustrates in elevation and in plan the mouthpiece of the apparatus which is placed over the bosom, Figure 5 shows in section the parts of the apparatus which contain valves and illustrates the construction of said valves.

The apparatus consists of a hand operated pump H, formed by the two arms 1 and 2 mounted in X form on a pivot H'; two tubes K, K' (one of which K' forms a piston) which may be either square, cylindrical, or of any other shape, are arranged to slide within one another and are respectively attached to the upper part of each of said arms. The upper ends of said arms 1 and 2 are connected by a spring I. The movement of these tubes is effected by intermittent hand pressure applied to the two longer ends of the arms, thereby causing alternate extraction and propulsion of the air in the interior of the other parts of the apparatus which are connected to each other and to said pump by means of tubing.

A vessel G made of glass or other suitable material, connected to the tube K by a short tube D, contains a small quantity of absorbent cotton Fig. 1 and is disposed between the pump and the milk receiving chamber L for the purpose of filtering the air during the forward movement of the piston, and thereby preventing the contamination of the milk. A tube D" connects the vessel G with the milk receiving chamber. Then comes the placing of the milk during the suction and propulsion interval of the pump, shown in detail in Figure 2 of the annexed drawing.

The various parts of this pump may be made of metal, glass, hardened india-rubber or any other suitable materials. The dimensions thereof may be varied and all the pieces are put together so as to be easily taken apart.

In the lower part of the milk receiving chamber L, a valve E is arranged (Fig. 1) which opens during the forward stroke of the piston and closes during the backward stroke thereof. Its form may be that shown in the drawing, but is may be any other, provided that it acts as a valve.

The milk receiving chamber is provided with a nipple $D^3$ connected by a tube D' to a valve chamber C which is made in two parts which are screwed together, in the interior of which is disposed a valve of suitable form which closes during the forward stroke of the piston and opens during its backward stroke. This valve chamber C is connected to the mouth-piece A by an india-rubber tube B (Fig. 1).

The height between the base and the conical end of the mouth-piece A is about 4 centimetres. As will be seen the characteristics distinguish it from similar devices which are practically worthless for the purpose for which they are intended.

The operation of the apparatus is simple and practical. The mouth-piece A is placed over the breast, care being taken to have the nipple opposite the central opening of said mouth-piece A. The lower part of the arms of the pump H are taken in one hand, and by rhythmical pressing movements the piston effects alternate suction of air from the apparatus and propulsion of air through part of the apparatus.

The suction stroke closes the valve E and extracts the air from all parts of the apparatus and draws the milk into the milk receiving chamber. The propulsion stroke closes the valve in the chamber C and propels the milk in the milk receiving chamber through the tube F into a receptacle. The rhythmical movements of the pump cause the nipple to move to and fro, intermittently, which is indispensable for the drawing off of the milk.

Having thus described my invention, what I claim is:

In a milk extractor, a milk-receiving chamber having a pump connection, a nipple receiver connection and an outlet or drain opening, a valve for the drain opening closing on sub-atmospheric condition within the chamber, a pump connecting with the respective connection of the chamber, a nipple-receiver having connection with the chamber through its point of connection, and a valve interposed in the latter connection and closing under above-atmospheric condition within the chamber.

In testimony whereof he hereunto affixes his signature in the presence of two witnesses.

MIGUEL R. del CASTILLO.

Witnesses:
 SANTIAGO ALLAFLOR,
 JUAN ECHAZARIETA.